(12) United States Patent
Lin (10) Patent No.: US 7,261,027 B2
(45) Date of Patent: Aug. 28, 2007

(54) SAWING MACHINE

(76) Inventor: Kuo-Chuan Lin, No. 1012, Hou Chuang Road, Pei-Tun District, Taichung (TW)

( * ) Notice: Subject to any disclaimer, the term of this patent is extended or adjusted under 35 U.S.C. 154(b) by 22 days.

(21) Appl. No.: 11/163,003

(22) Filed: Sep. 30, 2005

(65) Prior Publication Data

US 2007/0074615 A1   Apr. 5, 2007

(51) Int. Cl.
*B23D 53/04* (2006.01)
*B23D 55/04* (2006.01)

(52) U.S. Cl. ............... 83/788; 83/798; 83/799; 83/809; 83/813; 30/514

(58) Field of Classification Search ............ 83/788, 83/813, 794, 809, 814–819, 591, 796, 76, 83/74, 171, 170, 797, 798, 799, 811; 74/325, 74/333; D15/134; 30/514, 507, 522, 509
See application file for complete search history.

(56) References Cited

U.S. PATENT DOCUMENTS

| 853,479 | A | * | 5/1907 | Smith | 83/798 |
| 1,448,188 | A | * | 3/1923 | Brooke | 83/798 |
| 1,684,815 | A | * | 9/1928 | Wells | 83/798 |
| 2,381,988 | A | * | 8/1945 | Shortell | 83/522.14 |
| 2,946,250 | A | * | 7/1960 | Bahr | 83/176 |
| 3,385,330 | A | * | 5/1968 | Haynes | 83/799 |
| 3,504,585 | A | * | 4/1970 | Harris | 83/42 |
| 3,575,074 | A | * | 4/1971 | Aizawa | 83/796 |
| 3,715,946 | A | * | 2/1973 | Kaltenbach | 83/72 |
| 3,815,465 | A | * | 6/1974 | Smierciak | 83/820 |
| 3,952,622 | A | * | 4/1976 | Majus | 83/799 |
| 4,080,858 | A | * | 3/1978 | Stolzer | 83/247 |
| 4,305,318 | A | * | 12/1981 | Stolzer | 83/375 |
| 4,327,787 | A | * | 5/1982 | Loratto | 144/195.5 |
| 4,364,294 | A | * | 12/1982 | Eccardt | 83/796 |
| 4,454,795 | A | * | 6/1984 | Ellis | 83/820 |
| 6,684,515 | B1 | * | 2/2004 | Clark | 30/514 |

* cited by examiner

*Primary Examiner*—Boyer D. Ashley
*Assistant Examiner*—Ghassem Alie
(74) *Attorney, Agent, or Firm*—Alan Kamrath; Kamrath & Associates P.A.

(57) ABSTRACT

A sawing machine includes a workbench, a band saw pivotally installed on the workbench, a weight movable between an idle position on the workbench and a working position on the band saw and an adjustable torque provider for providing an adjustable torque to the band saw. The adjustable torque is set to a maximum when the weight is in the idle position in order to lift the band saw from the workbench. The adjustable torque is set to a minimum when the weight is in the working position in order to lower the band saw toward the workbench.

16 Claims, 10 Drawing Sheets

SAWING MACHINE

BACKGROUND OF INVENTION

1. Field of Invention

The present invention relates to a sawing machine based on a band saw and, more particularly, to a device for retaining such a sawing machine in a sawing position.

2. Related Prior Art

There are many sawing machines based on band saws. In such a sawing machine, a band saw is pivotally installed on a workbench and is moved automatically relative to the workbench. Normally, the band saw is lifted from the workbench automatically. Hence, workpiece can be put on the workbench under the band saw. While sawing, a user presses the band saw to the workpiece. Some workpieces are thin, while others are thick. Some workpieces are hollow, while others are solid. In some cases, it takes only a while to saw a workpiece. However, in other cases, it takes quite some time to saw a workpiece. In this case, it is exhausting for the user to keep on pressing the band saw downwardly toward the workbench. Moreover, it is difficult for the user to press the band saw in a consistent manner. Sometimes, the user might press the band saw against the workpiece with too much force or too little force. The user might damage the band saw by pressing the band saw too hard against the workpiece. Pressing too gently, the user might spend too much time on the task. In addition, it is a waste of time, since the user can do almost nothing else while pressing the band saw.

The present invention is therefore intended to obviate or at least alleviate the problems encountered in the prior art.

SUMMARY OF INVENTION

According to the present invention, a sawing machine includes a workbench, a band saw pivotally installed on the workbench, a weight movable between an idle position on the workbench and a working position on the band saw and an adjustable torque provider for providing an adjustable torque to the band saw. The adjustable torque is set to a maximum when the weight is in the idle position in order to lift the band saw from the workbench. The adjustable torque is set to a minimum when the weight is in the working position in order to lower the band saw toward the workbench.

The primary advantage of the sawing machine of the present invention is its adaptability to a long-winded sawing task and repeated brief sawing tasks.

Other advantages and novel features of the invention will become more apparent from the following detailed description in conjunction to the drawings.

BRIEF DESCRIPTION OF DRAWINGS

The present invention will be described through detailed illustration of the embodiment referring to the drawings.

DETAILED DESCRIPTION OF PREFERRED EMBODIMENT

Figure 1:
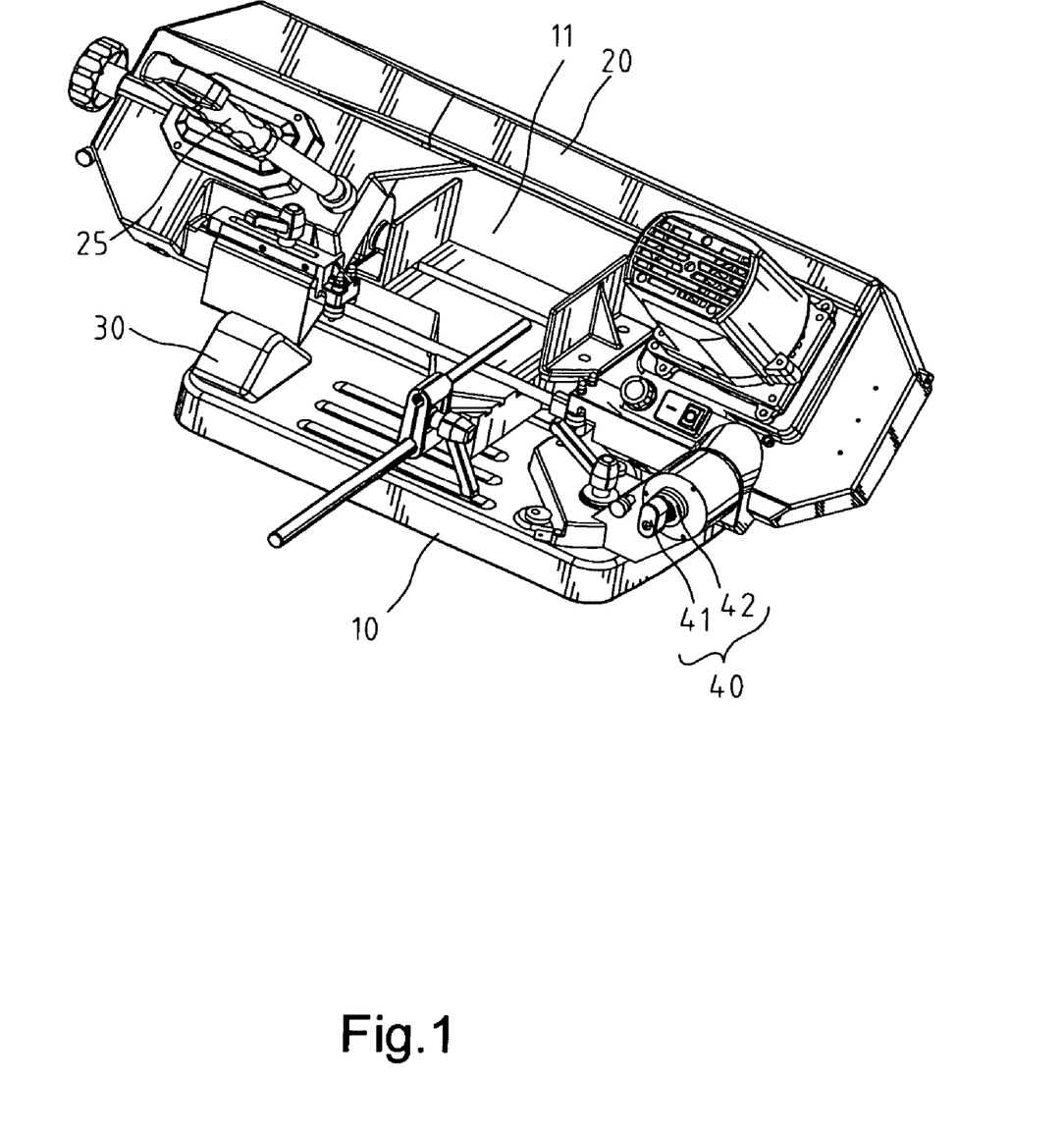
FIG. 1 is a perspective view of a sawing machine based on a band saw and equipped with a device for keeping the band saw in a working position according to the present invention.

Referring to FIG. 1, there is shown a sawing machine based on a band saw and equipped with a device for retaining the band saw in a sawing position. The sawing machine includes a workbench 10. The band saw includes a frame 20 pivotally installed on the workbench 10 and a blade 26 movably connected to the frame 20. The blade 26 can be moved by a motor 27 installed on the frame 20. The device includes a weight 30 and an adjustable torque provider 40.

Figure 2:
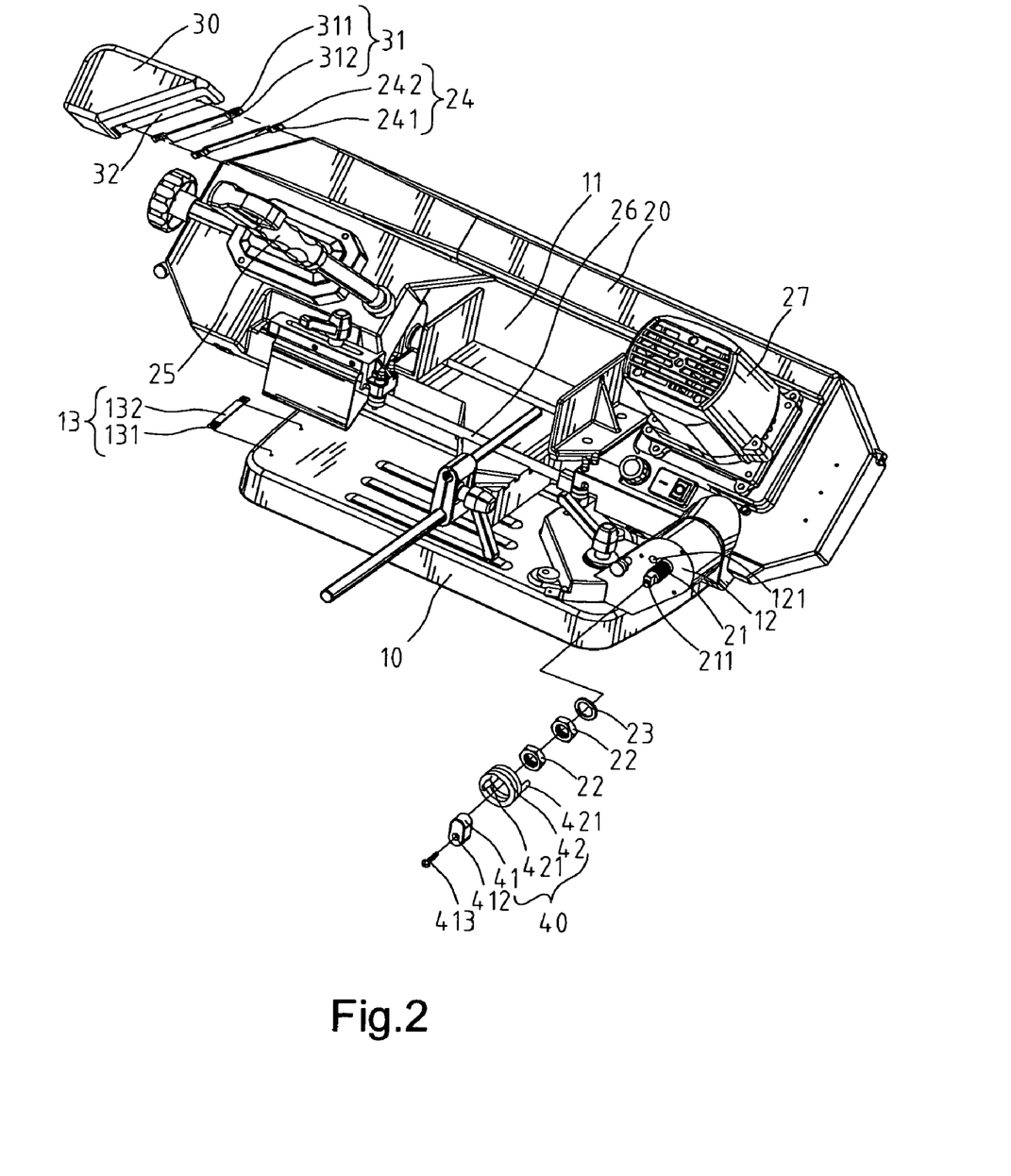
FIG. 2 is an exploded view of the sawing machine shown in FIG. 1.
Figure 3:
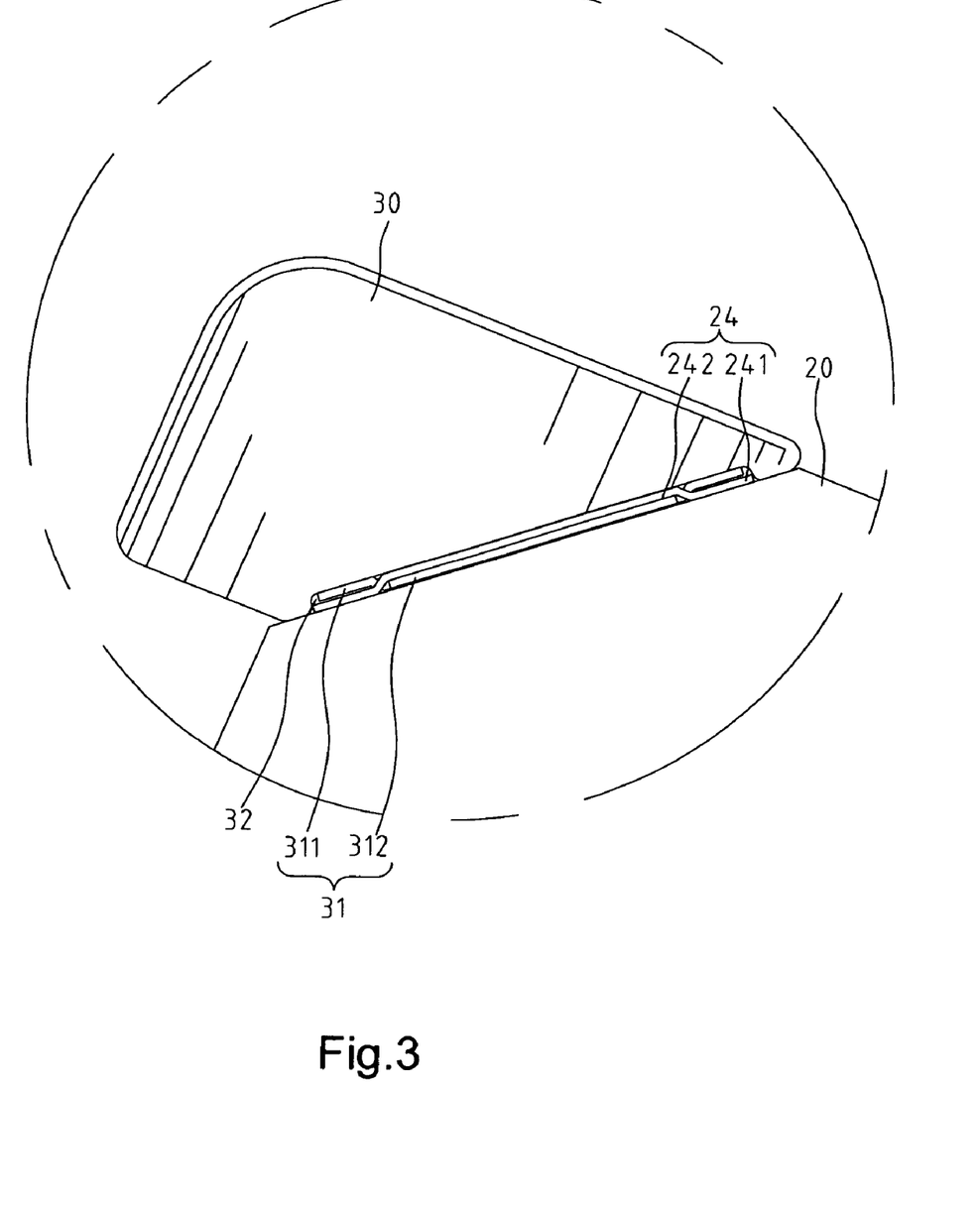
FIG. 3 is a partial front view of the sawing machine shown in FIG. 1.
Figure 4:
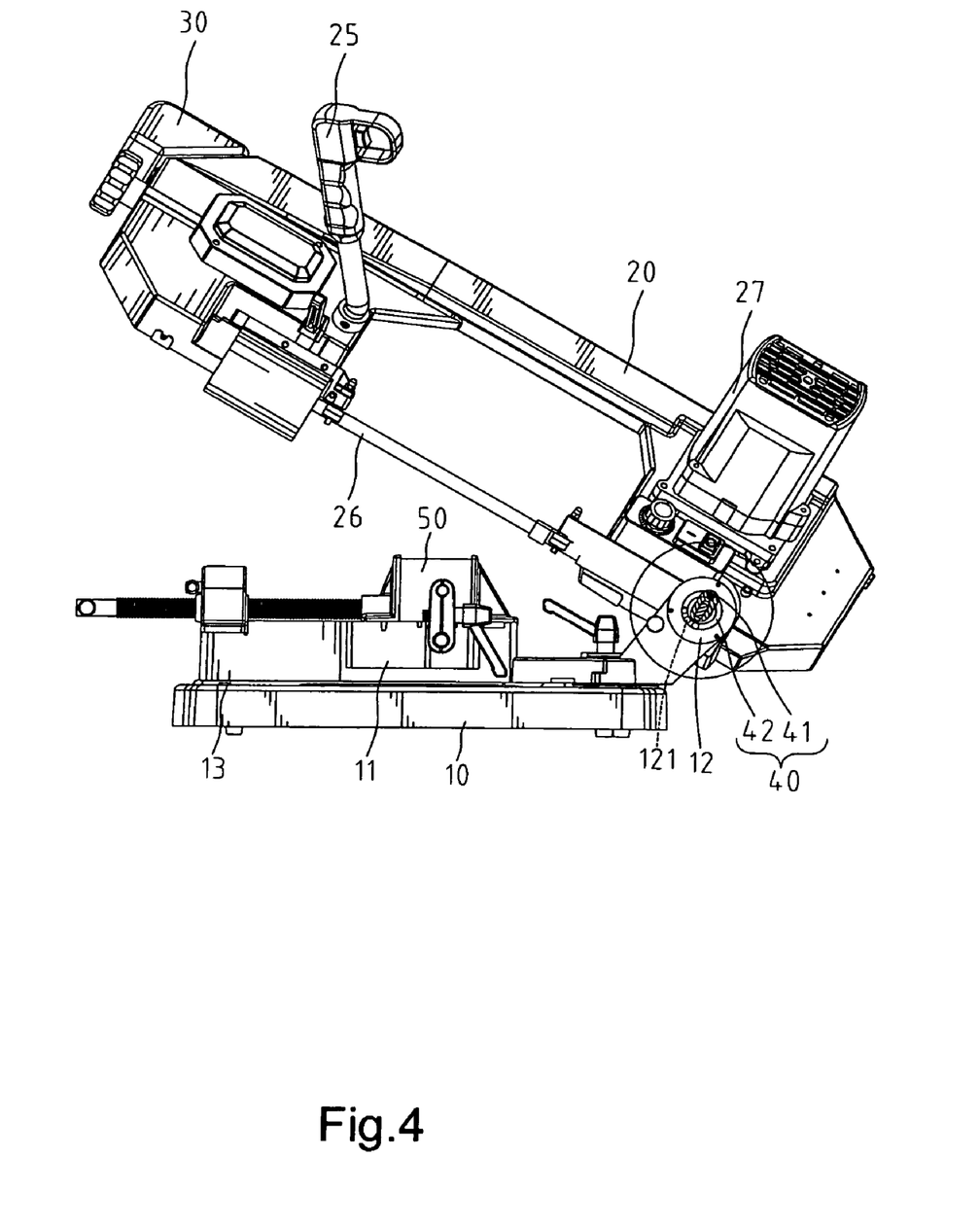
FIG. 4 is a front view of the sawing machine shown in FIG. 1 ready for sawing a solid workpiece.
Figure 6:
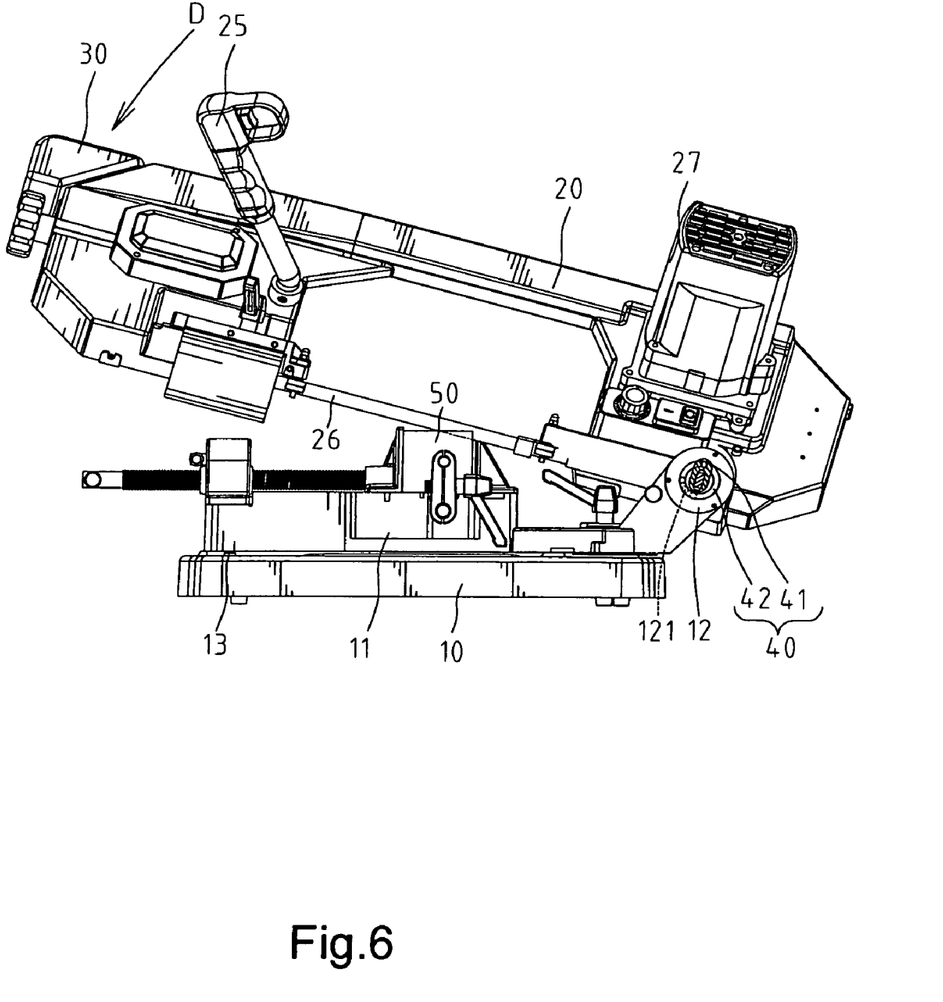
FIG. 6 is another front view of the sawing machine shown in FIG. 4 while sawing the solid workpiece.
Figure 7:
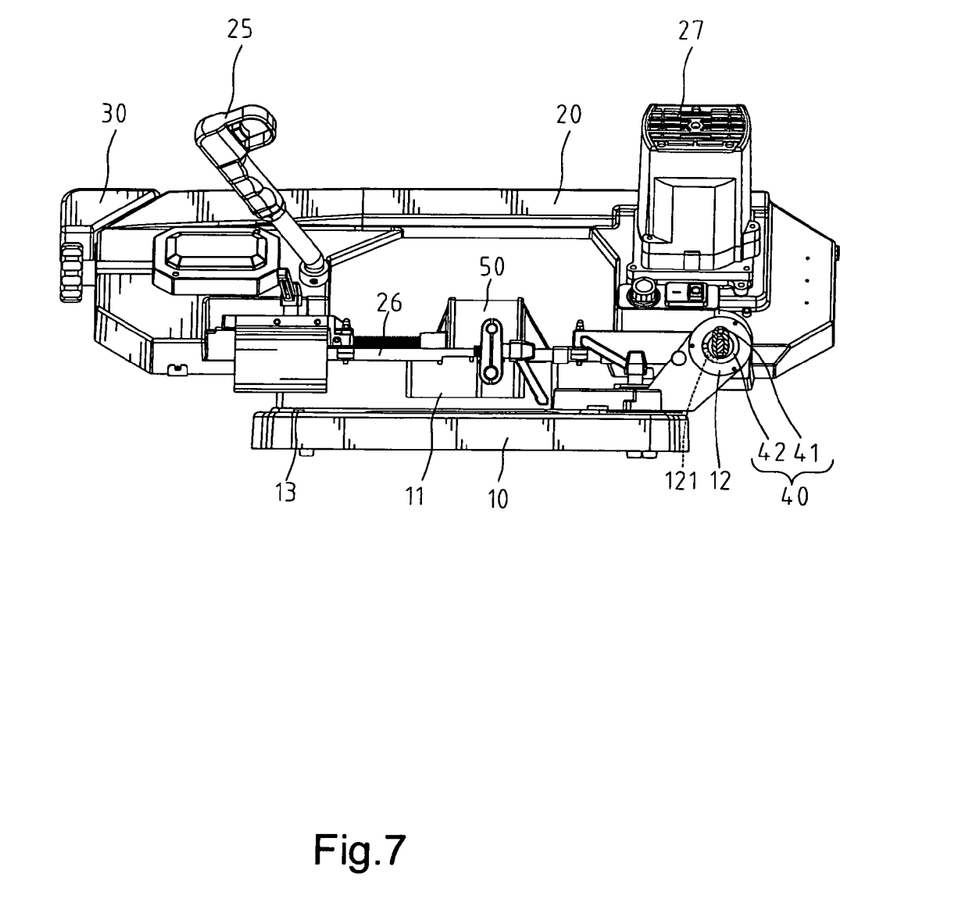
FIG. 7 is another front view of the sawing machine shown in FIG. 6 after sawing the solid workpiece.
Figure 8:
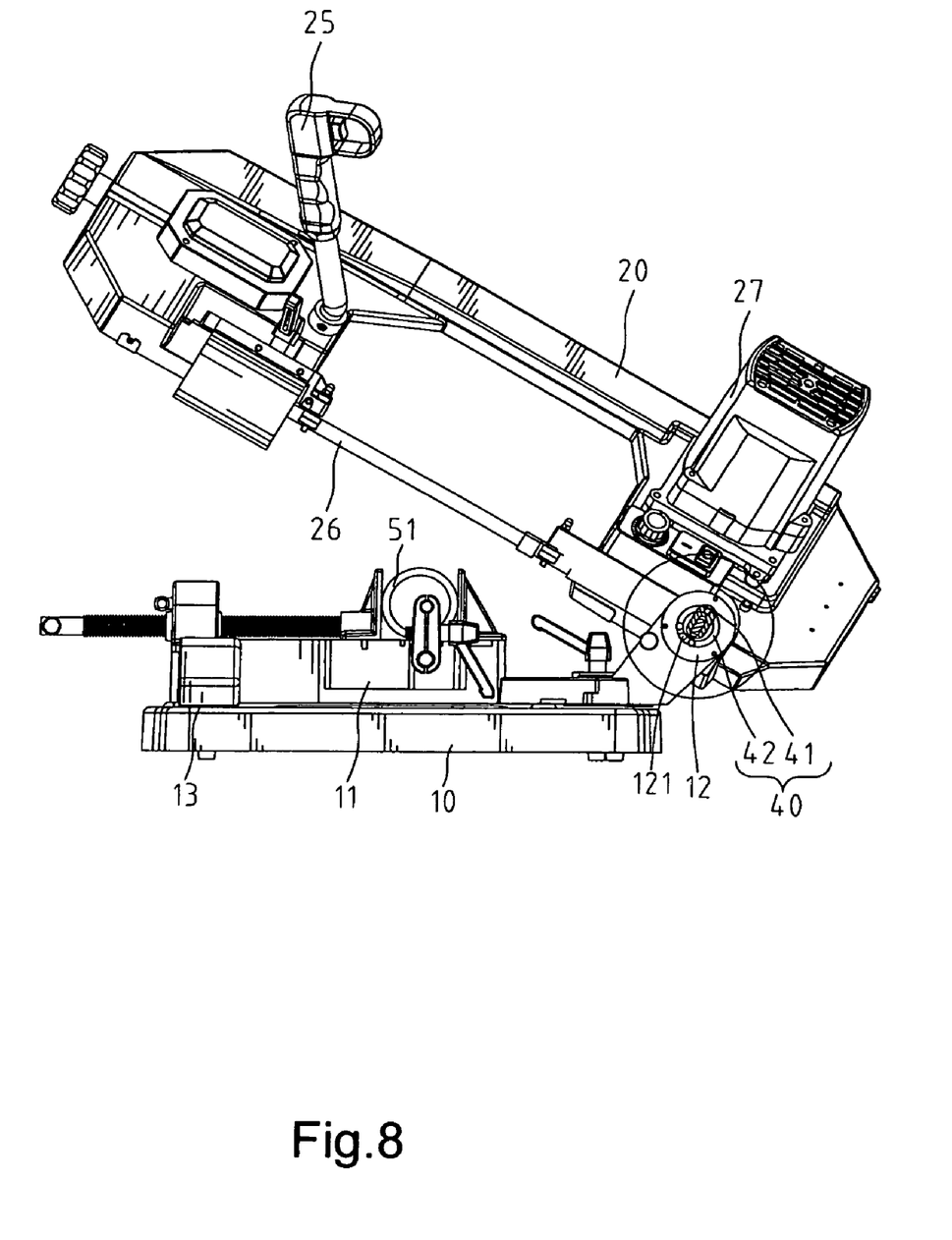
FIG. 8 is a front view of the sawing machine shown in FIG. 1 ready for sawing a hollow workpiece.
Figure 10:
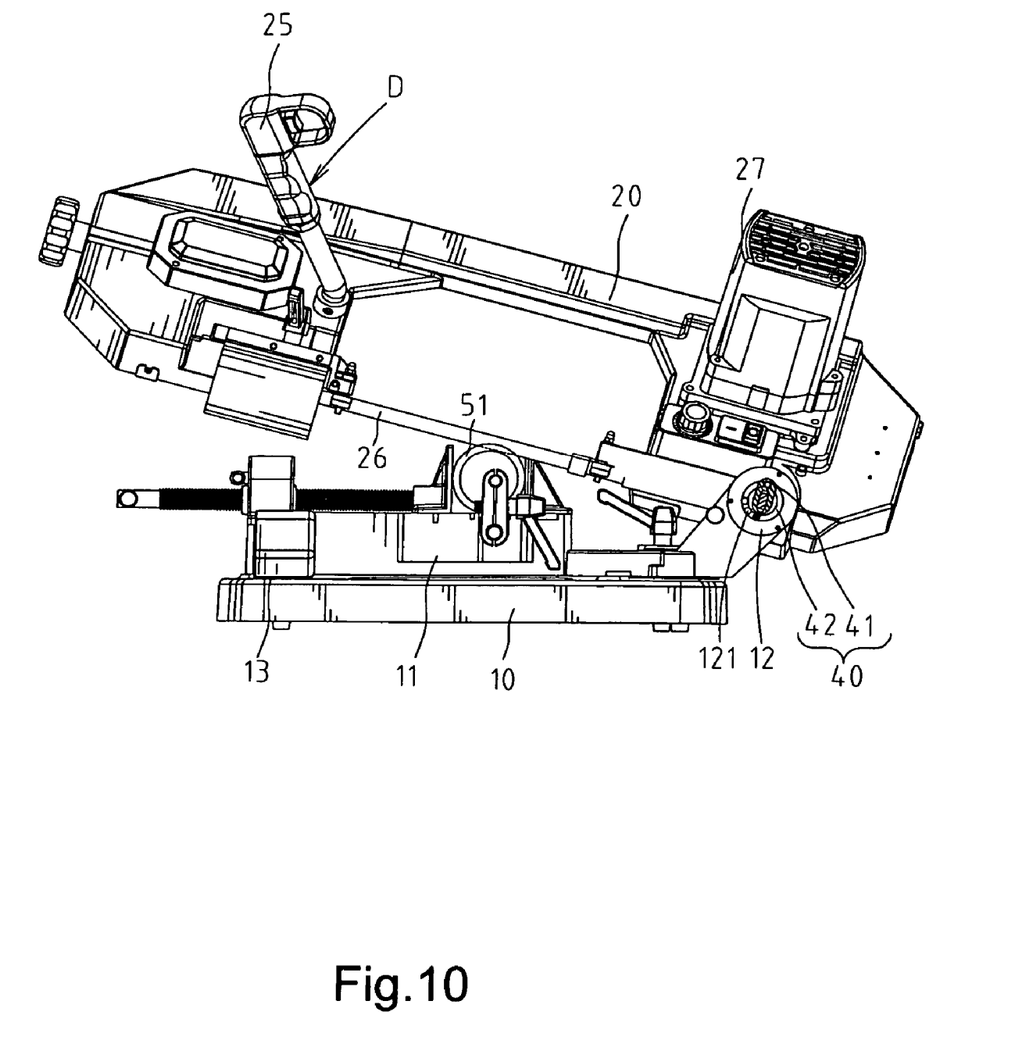
FIG. 10 is another front view of the sawing machine shown in FIG. 8 while sawing the hollow workpiece.

Referring to FIGS. 2 and 3, on the workbench 10 is installed a vice 11 for clamping a workpiece such as a workpiece 50 shown in FIGS. 4, 6 and 7 and a workpiece 51 shown in FIGS. 8 and 10. A bearing 12 is installed on the workbench 10. In a front surface of the bearing 12 are defined adjustment holes 121 along an arc. A buckle 13 is installed on the workbench 10. The buckle 13 is a strip including two ends 131 and a middle portion 132 in a different plane from that of the ends 131. The buckle 13 is T-shaped, i.e., the middle portion 132 extends longer than the ends 131. A screw (not shown) is driven into the workbench 10 through each of the ends 131 in order to secure the buckle 13 to the workbench 10. There is a gap between the middle portion 132 and the workbench 10.

The frame 20 includes a first end and a second end. An axle 21 is extended from the frame 20 near the first end. The axle 21 is inserted through the bearing 12 so that the frame 20 is pivotally installed on the workbench 10. The axle 21 includes a flat tip 211 and a thread (not numbered) near the flat tip 211. The thread of the axle 21 is engaged with the threads of two nuts 22. A washer 23 is provided between the bearing 12 and the nuts 22.

A buckle 24 is attached to the frame 20 near the second end. The buckle 24 includes two ends 241 and a middle portion 242 in a different plane from that of the ends 241. A screw (not shown) is driven into the frame 20 through each of the ends 241 in order to attach the buckle 24 to the frame 20. There is a gap between the middle portion 242 and the frame 20. The buckle 24 is similar to the buckle 13.

A handle 25 is extended from the frame 20 near the second end. A user can hold the handle 25 in order to pivot the frame 20 as well as the blade 26 easily.

A hook 31 is attached to the weight 30. The hook 31 is put in a recess 32 defined in the weight 30. The hook 31 includes two ends 311 and a middle portion 312 in a different plane from that of the ends 311. A screw (not shown) is driven into the weight 30 through each of the ends 311 in order to secure the hook 31 to the weight 30. Between the middle portion 312 and the weight 30 is a gap.

When the weight 30 is idle, the middle portion 312 of the hook 31 is inserted in the gap between the workbench 10 and the middle portion 132 of the buckle 13. Thus, the weight 30 is attached to the workbench 10 firmly and will not be lost.

When the weight 30 is in use, the middle portion 312 of the hook 31 is inserted in the gap between the frame 20 and the middle portion 242 of the buckle 24. Thus, the weight 30 is attached to the second end of the frame 20 firmly.

Figure 5:
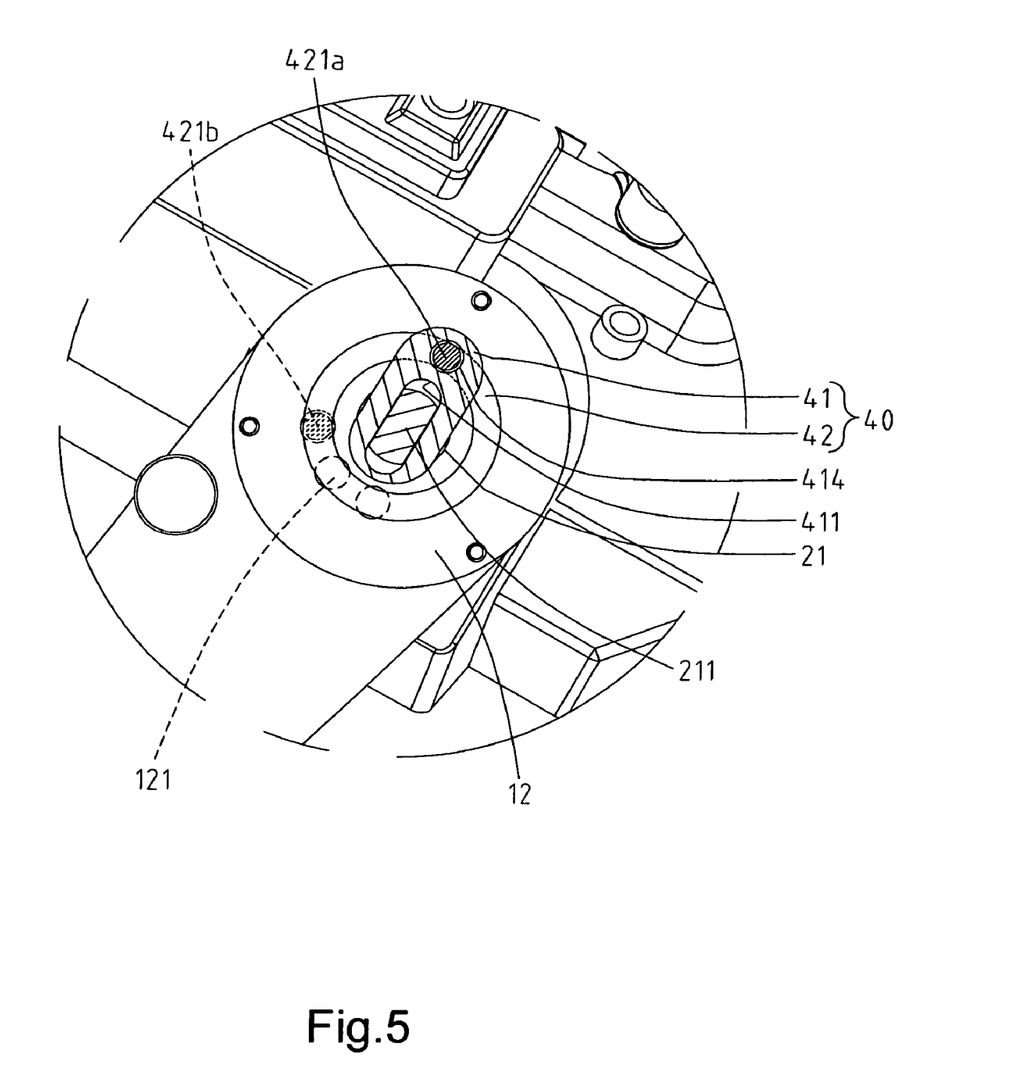
FIG. 5 is a partial cross-sectional view of the sawing machine shown in FIG. 4.

Referring to FIGS. 4 and 5, the adjustable torque provider 40 is provided between the bearing 12 and the axle 21 in order to provide an adjustable torque tending to lift the frame 20 from the workbench 10. That is, the speed of the pivotal movement of the frame 20 from the workbench 10 can be adjusted.

The adjustable torque provider 40 includes a cap 41 and a torque spring 42. The cap 41 defines a groove 411 and a hole 414. The cap 41 is put on the axle 21, with the groove 411 receiving the flat tip 211. A screw 413 is driven into a screw hole (not numbered) in the flat tip 211 of the axle 21 through an aperture 412 in the cap 41 in order to secure the cap 41 to the axle 21. The torque spring 42 includes a first end 421a and a second end 421b. The first end 421a is inserted in the hole 414. The second end 421b is selectively inserted in one of the adjustment holes 121. Thus, the torque tending to lift the frame 20 from the workbench 10 is adjustable. To move the second end 421b from one adjustment hole 121 to another adjustment hole 121, the screw 413 has to be loosened in advance.

Referring to FIGS. 6 and 7, the solid workpiece 50 is held on the workbench 10 by the vice 11. It is assumed that a lot of time is needed to complete the sawing of the solid workpiece 50. Hence, it is intended to keep the blade 26 on the solid workpiece 50 for a long period of time. To this end, the torque tending to lift the frame 20 from the workbench 10 is set to the minimum. The weight 30 is moved to the frame 20 from the workbench 10. Thus, the total torque tending to pivot down the frame 20 in the direction D overcomes the torque by the torque spring 42 so that the frame 20 is kept on the solid workpiece 50 automatically. The user can do other things while the sawing is going on. This is economical.

Figure 9:
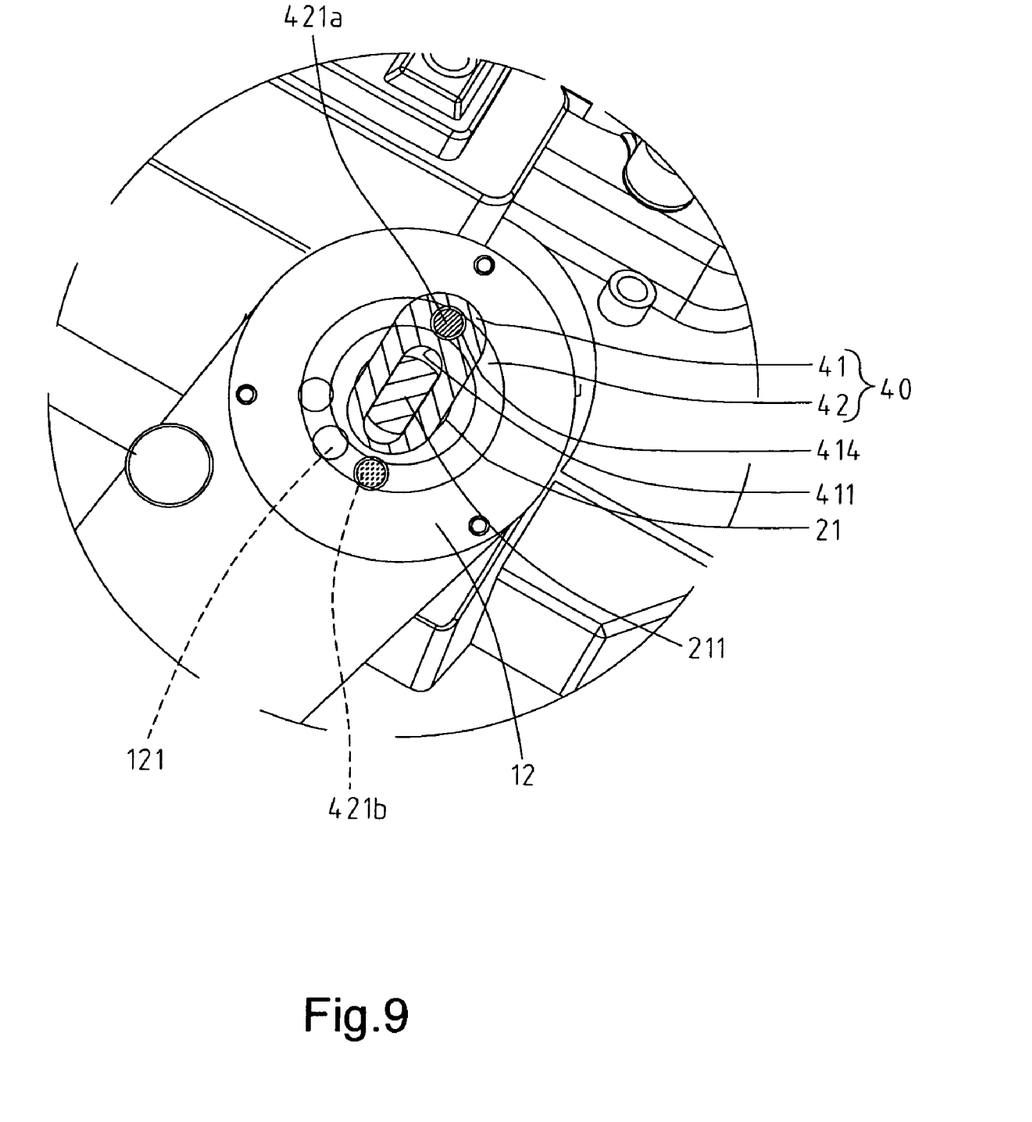
FIG. 9 is a partial cross-sectional view of the sawing machine shown in FIG. 8.

Referring to FIGS. 8 through 10, the hollow workpiece 51 is held on the workbench 10 by the vice 11. It is assumed that only a little time is needed to complete the sawing of the hollow workpiece 51. It is also assumed that the user may want to saw such hollow workpieces one after another. Hence, it is preferred that the frame 20 be lifted from the workbench 10 after the sawing of one hollow workpiece is complete. To this end, the torque tending to lift the frame 20 from the workbench 10 is set to the maximum. The weight 30 is moved to the workbench 10 from the frame 20. Thus, the torque by the torque spring 42 overcomes the total torque tending to pivot down the frame 20 in the direction D so that the frame 20 is lifted from the workbench 10 automatically. This is convenient.

The sawing machine according to the present invention exhibits several advantageous features.

Firstly, the weight 30 can be put on the frame 20 in order to keep the blade 26 on the solid workpiece 50 automatically so that the user can do things while sawing the solid workpiece 50. When idle, the weight 30 can be held on the workbench 10 and will not be lost.

Secondly, the torque by the torque spring 42 is adjustable so that the pivotal movement of the frame 20 can proceed at proper speeds based on different working situations.

Thirdly, the adjustable torque provider 40 includes a simple structure consisting of a few elements. Thus, the adjustable torque provider 40 can be made easily at a low cost. Moreover, the adjustable torque provider 40 is easily operable.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A sawing machine comprising:
a workbench;
a band saw pivotally installed on the workbench, wherein the band saw comprises a frame pivotally installed on the workbench and a blade movably connected to the frame;
a weight movable between an idle position on the workbench and a working position on the band saw;
an adjustable torque provider for providing an adjustable torque to the band saw, wherein the adjustable torque is set to a maximum when the weight is in the idle position in order to lift the band saw from the workbench, wherein the adjustable torque is set to a minimum when the weight is in the working position in order to lower the band saw toward the workbench;
a hook attached to the weight in order to selectively hook the weight to one of the workbench and the frame; and
a buckle installed on the workbench for engagement with the hook.

2. The sawing machine according to claim 1 wherein the buckle comprises two ends attached to the workbench and a middle portion higher than the ends thereof in order to define a gap between the middle portion and the workbench in order to receive the hook.

3. The sawing machine according to claim 1 comprising a vice installed on the workbench in order to clamp a workpiece.

4. A sawing machine comprising:
a workbench;
a band saw pivotally installed on the workbench, wherein the band saw comprises a frame pivotally installed on the workbench and a blade movably connected to the frame;
a weight movable between an idle position on the workbench and a working position on the band saw; an adjustable torque provider for providing an adjustable torque to the band saw, wherein the adjustable torque is set to a maximum when the weight is in the idle position in order to lift the band saw from the workbench, wherein the adjustable torque is set to a minimum when the weight is in the working position in order to lower the band saw toward the workbench;
a hook attached to the weight in order to selectively hook the weight to one of the workbench and the frame; and
a buckle installed on the frame for engagement with the hook.

5. The sawing machine according to claim 4 wherein the buckle comprises two ends attached to the frame and a middle portion higher than the ends thereof in order to define a gap between the middle portion and the frame in order to receive the hook.

6. The sawing machine according to claim 4 comprising a vice installed on the workbench in order to clamp a workpiece.

7. A sawing machine comprising:
a workbench;
a band saw pivotally installed on the workbench, wherein the band saw comprises a frame pivotally installed on the workbench and a blade movably connected to the frame;
a weight movable between an idle position on the workbench and a working position on the band saw; and
an adjustable torque provider for providing an adjustable torque to the band saw, wherein the adjustable torque is set to a maximum when the weight is in the idle position in order to lift the band saw from the workbench, wherein the adjustable torque is set to a minimum when the weight is in the working position in order to lower the band saw toward the workbench, wherein the workbench comprises a bearing installed thereon, wherein the frame comprises an axle installed on the bearing, wherein the adjustable torque provider comprises adjustment holes defined in a surface of the bearing and a torque spring with a first end secured to the axle and a second end selectively inserted into one of the adjustment holes so that the torque on the frame is adjustable by the torque spring.

8. The sawing machine according to claim 7 comprising a hook attached to the weight in order to selectively hook the weight to one of the workbench and the frame.

9. The sawing machine according to claim 8 wherein the hook comprises two ends attached to the weight and a middle portion extending outwardly from the ends in order to selectively hook the weight to one of the workbench and the frame.

10. The sawing machine according to claim 9 wherein the hook is a T-shaped element.

11. The sawing machine according to claim 8 wherein the weight defines a recess for receiving the hook.

12. The sawing machine according to claim 7 wherein the adjustable torque provider comprises a cap connected to both of the axle and the second end of the spring.

13. The sawing machine according to claim 12 wherein the axle comprises a flat tip, wherein the cap defines a groove in order to receive the flat tip of the axle.

14. The sawing machine according to claim 12 wherein the cap defines a hole in order to receive the second end of the torque spring.

15. The sawing machine according to claim 13 wherein the adjustable torque provider comprises a screw driven into the flat tip of the axle through the cap.

16. The sawing machine according to claim 7 comprising a vice installed on the workbench in order to clamp a workpiece.

* * * * *